(No Model.)
B. H. WILLIAMS.
METHOD OF LOCKING NUTS TO BOLTS.
No. 299,447. Patented May 27, 1884.
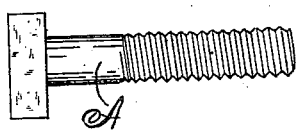
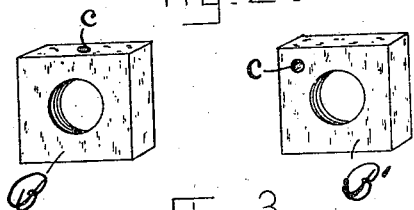
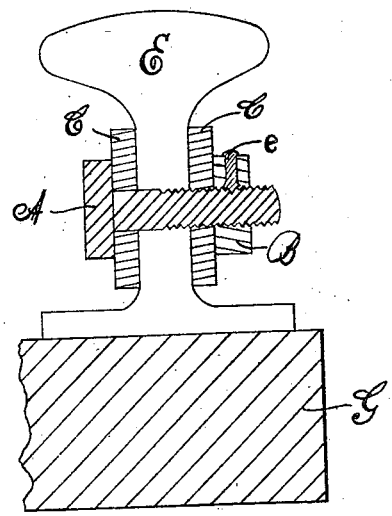
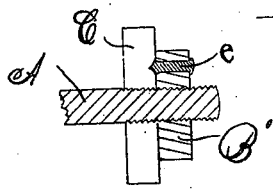
WITNESSES.
Amos C. Cutler.
S. Ashbel Crandall.
INVENTOR,
Benjamin H. Williams
By his Attorney
Frank N. Allen

UNITED STATES PATENT OFFICE.

BENJAMIN H. WILLIAMS, OF LAWRENCEVILLE, PENNSYLVANIA.

METHOD OF LOCKING NUTS TO BOLTS.

SPECIFICATION forming part of Letters Patent No. 299,447, dated May 27, 1884.

Application filed September 1, 1883. (No model.)

*To all whom it may concern:*

Be it known that I, BENJAMIN H. WILLIAMS, of Lawrenceville, county of Tioga, and State of Pennsylvania, have invented certain new and useful Improvements in Methods of Securing Nuts to Bolts, which improvements are fully set forth and described in the following specification, reference being had to the accompanying drawings.

My improvement relates to that class of mechanical devices commonly known as "nut-locks," by means of which nuts may be so secured to bolts that the ordinary jar of the mechanism to which they are attached cannot loosen the nuts, yet when sufficient power is exerted in a proper way said nuts may be removed, and the same bolts and nuts be again used, if so desired.

My object is to produce a nut-lock which may be cheaply made, and which may be readily understood and used by any one of ordinary intelligence.

In the annexed drawings, Figure 1 is a side view of a bolt as commonly constructed and as used with my new form of nut-lock. Fig. 2 represents the nuts of my device as used in Figs. 4 and 5. Fig. 3 is a detached view of the wire which completes the lock. Fig. 4 is a view in section showing my device applied to railroad-rails. Fig. 5 shows my locking-wire as upset against the fish-plate, instead of against the bolt, as in Fig. 4.

The general principle of my lock is, briefly stated, as follows: A suitable hole, $c$, is provided in the nut, and after said nut is screwed home a depression is made in the bolt or fish-plate at the bottom of said hole. A piece of wire which fills hole $c$ is then introduced, and is upset against the bolt or fish-plate, said principle of upsetting or riveting the inner and outer ends of the wire being the prime feature of my invention.

A represents a bolt provided with the customary head at one end, and threaded at the other end.

B B' represent nuts tapped to fit the above-mentioned bolt, they being in general appearance identical with nuts as commonly made and used. Said nuts may be square, hexagonal, or of any practical shape. On one or more sides of nut B are holes $c$, leading into the central hole through which the bolt passes.

$e$ in Fig. 3 represents a piece of wire, of brass, copper, or other suitable material, of such size that it will slip tightly into the hole $c$ in the nut.

In Fig. 4, G represents a portion of a railroad-sleeper supporting the rail E. On each side of E is a fish-plate, C, as ordinarily used, said fish-plates being drilled to receive the bolt A. After having passed the bolt through the fish-plates and rail, the nut B is screwed tightly onto the bolt. A prick-punch or other pointed tool is entered in hole $c$, and struck sharply with a hammer, thereby indenting the bolt or fish-plate. The wire $e$ is now introduced into $c$, and its outer end struck repeatedly, as in the act of riveting, when both the outer and inner ends of said wire become upset or headed, the inner end being forced into the indented bolt, and preventing the nut from turning under ordinary usage. Should it, however, become necessary to remove the nut, a suitable degree of leverage applied to the nut will cut off that part of wire $e$ which extends into the bolt, the nut and bolt acting as shears under such powerful leverage. The nut may then be easily unscrewed, the old wire punched out, and said nut may be used repeatedly, if so desired.

In Fig. 5 the hole in nut B' is made parallel with the bolt and adapted to lock against the fish-plate, instead of against the bolt, the details of use and construction being otherwise the same as before described.

I am aware that bolts have been constructed with a longitudinal groove or key-seat to receive a spline or similar locking device, and am also aware of Carney's patent, No. 197,923, in which the nut seat or washer must be previously serrated or notched, and in which the metal must be placed in the back side of the nut before said nut is screwed home, all of which devices are hereby disclaimed.

What I do claim as new, and wish to secure by Letters Patent, is—

The within-described method of locking nuts to bolts, consisting of perforating the nut, as at c, the inner side of said perforation being somewhat enlarged, screwing said nut firmly onto the bolt, inserting a prick-punch in c, and indenting the bolt or nut-seat, then inserting a pin whose outer end remains above the surface of said nut, and riveting said pin, thereby upsetting both its outer and inner ends and filling the prick-punched indentation, as and for the purpose specified.

BENJAMIN H. WILLIAMS.

Witnesses:
FRANK H. ALLEN,
FRANK L. LATHROP.